United States Patent Office 2,836,886
Patented June 3, 1958

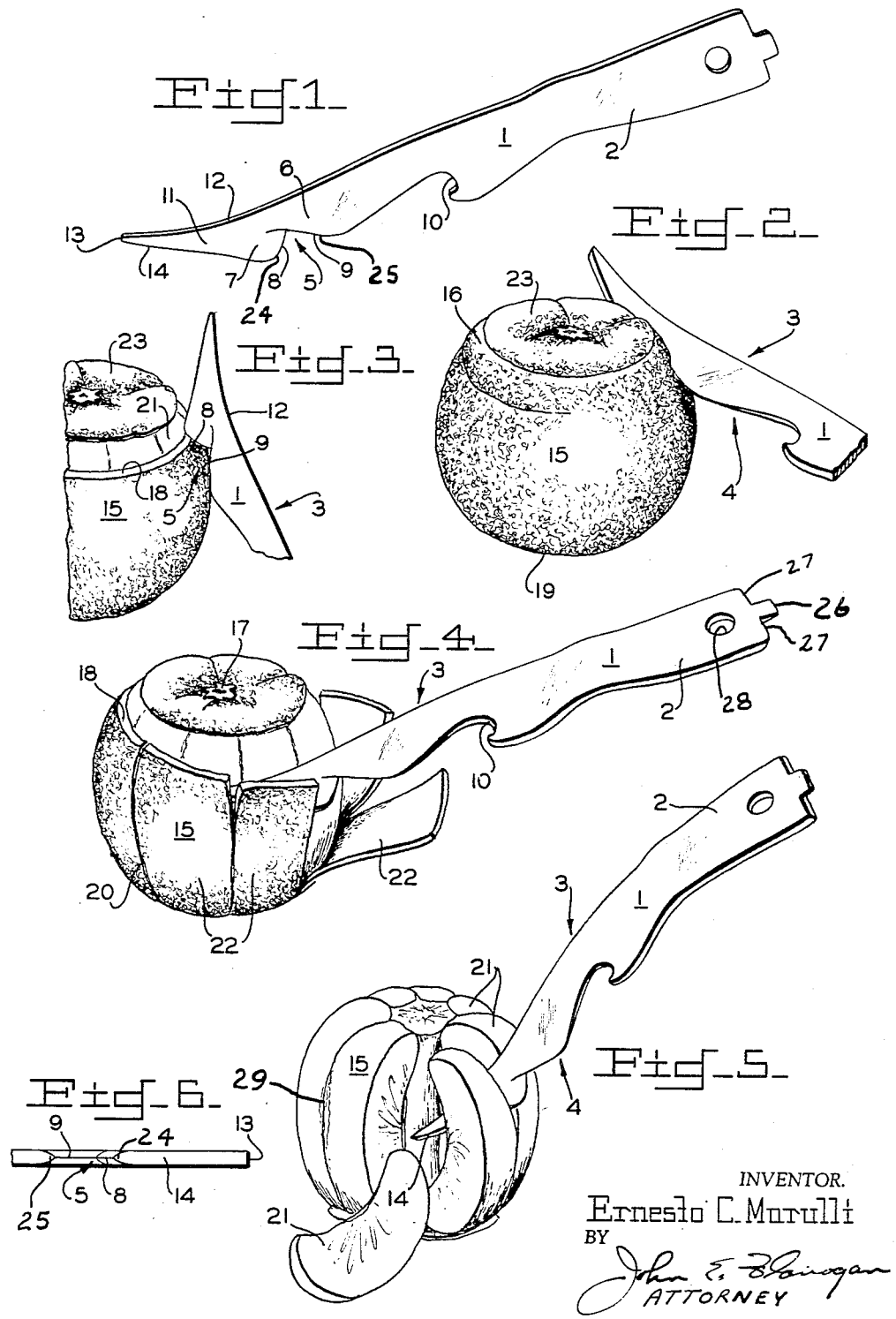

2,836,886

ORANGE KNIFE

Ernesto C. Marulli, Holyoke, Mass.

Application June 14, 1957, Serial No. 665,856

1 Claim. (Cl. 30—24)

This invention relates to knives and more particularly to orange-knives. An object of the present invention is to provide a knife which will enable a user to remove the skin from an orange without inflicting any incisions or punctures to the several orange sections.

A further object of the present invention is to provide an orange-knife which can be used by an inexperienced user with as much ease as when used by an experienced user.

Other objects and advantages embraced in the present invention will be disclosed in the following description and in the accompanying illustrations in which like parts are designated by like reference characters, and in which:

Fig. 1 is a perspective view of the novel orange knife.

Fig. 2 is a perspective view of the knife in cutting position on an orange skin.

Fig. 3 is a fragmentary perspective view of the knife hanging on an orange skin ridge by the knife's cutting notch.

Fig. 4 is a perspective view of the knife working the orange skin away from the orange sections.

Fig. 5 is a perspective view of the knife separating the orange sections, one from another, and Fig. 6 is a fragmentary bottom view of the working end of the knife.

Referring to the illustrations, the present invention is a one piece instrument, having a shape generally resembling a knife blade and generally designated 1. It has a handle section 2, a non-cutting side generally designated 3 and a cutting side generally designated 4.

A V notch generally designated 5 is formed in the cutting side 4 and the arms 6 and 7 of the V notch are formed as a knife edge 9 and a knife edge 8, respectively.

A thumb recess 10 is formed into the cutting side 4 between the handle section 2 and the V notch 5.

The knife has a triangular working end 11 and the non-cutting side of the working end is arcuately shaped as at 12 so as it will circumferentially hug the outside of an orange when positioned transversely adjacent thereto (Fig. 4) and end 11's extremity and bottom is shaped similar to a pick ax having a point 13 and a spatular shaped side 14 opposite side 12 (Fig. 6).

The outer ends of the arms of V-notch 5 are flared out at 24 and 25, respectively (Fig. 6), so that they will not cut, thereby limiting the cutting length of the V-notch to the portion which is between 24 and 25.

In using my device, an orange generally designated 15, is taken in one hand and my improved orange-knife in the other hand. Preferably, an annular section 16 of the orange skin is cut from the orange, near its stem center 17, by drawing the V notch around and into the orange skin as shown in Fig. 2 and then removing the annular skin section 16 away from the orange by inserting end 11 under the annular section of skin, at several positions, until the ring skin can be separated from the orange. The V notch 5 is now hung on the annular skin ridge 18, as shown in Fig. 3 and the cutting edge 9 is drawn downwardly away from the stem center 17 towards its opposite skin center 19, while pressing knife edge 9 gently into the orange skin so as to start a cut 20 therein and following with knife edge 8, pressing against arcuate section 12 sufficiently to cut through the orange skin. When at least two longitudinal cuts are made in the orange skin, arcuate section 12 of the knife is placed against the orange section 21 and behind the orange skin, transverse to the longitudinal cuts, and then the device is advanced transversely so as it will pry the skin sections 22, between the slits 20 away from the orange, as is clearly shown in Fig. 4.

Since the outer ends of the V notch arms are flared out, the orange sections will not be cut as the knife is pressed inwardly towards the orange section as just described, but will only be cut when a longitudinal stroke is made with the knife.

This procedure is continued until all the skin desired to be removed is removed. Preferably the skin 23 surrounding the stem 17 is left till last and the orange is handled at this position for sanitary purposes while the remainder of the skin is removed from the orange.

The orange sections are now separated, as shown in Fig. 5, by placing side 14 of the working half of the device between two orange sections and then wiggling it until the two adjacent sections separate.

My knife can be gripped and manipulated best when prying skin sections 22 away from the orange sections 21 if the user puts his thumb around the thumb-lock 10.

A wedge shaped scraper 26 is formed on the end of the handle section 2, between shoulders 27 and is used to scrape the rag of the orange left on the orange sections after the skin is removed. This is done by using the scraper in a conventional manner. The shoulders 27 act as runners when the rag is being scraped out of the furrows 29 in-between adjacent orange sections, by placing the scraper in the furrow and then resting the runners on their adjacent orange section. The scraper is now moved longitudinally along the furrow, by sliding the shoulders along the orange sections that they are resting on.

A hole 28 is provided for hanging the knife on a peg or hook.

Although my invention has been described, the terms used are to be deemed terms of description rather than terms of limitation, my intention being to retain the right to all mechanical equivalents of the structural elements depicted provided they fall within the purview of the following claim.

Having thus disclosed and revealed my invention, what I claim as new and desire to secure by Letters Patent is:

A knife for peeling and dismembering oranges and the like, comprising a singular and generally knife-blade shaped member, said member having a handle section at one end, a cutting side, an opposite non-cutting side, a cutting V-notch having two arms formed in the cutting side, the inner portion of the arms of the V-notch being formed as cutting edges, the outer portions of said arms being flared to form non-cutting edges.

References Cited in the file of this patent

UNITED STATES PATENTS

| | | |
|---|---|---|
| 2,258,448 | Gesell | Oct. 7, 1941 |
| 2,309,177 | Eifler | Jan. 26, 1943 |
| 2,522,054 | Novak | Sept. 12, 1950 |
| 2,528,071 | Morishita | Oct. 31, 1950 |
| 2,546,032 | Holmberg | Mar. 20, 1951 |
| 2,692,428 | Morishita | Oct. 26, 1954 |